United States Patent [19]

Robinson, Jr. et al.

[11] 4,074,705
[45] Feb. 21, 1978

[54] SOLAR COLLECTOR APPARATUS AND METHOD

[75] Inventors: Glen P. Robinson, Jr., Atlanta; Samuel V. Shelton, Stone Mountain; Samuel F. Hutchins, Lilburn, all of Ga.

[73] Assignee: Scientific-Atlanta, Inc., Atlanta, Ga.

[21] Appl. No.: 660,249

[22] Filed: Feb. 23, 1976

[51] Int. Cl.² .............................................. F24J 3/02
[52] U.S. Cl. ................................... 126/271; 237/1 A
[58] Field of Search .................. 126/270, 271; 60/641; 237/1 A; 165/18, 48

[56] References Cited

U.S. PATENT DOCUMENTS

| | | | |
|---|---|---|---|
| 1,101,001 | 6/1914 | Willsie | 126/271 |
| 1,951,403 | 3/1934 | Goddard | 126/271 |
| 3,236,294 | 2/1966 | Thomason | 126/271 |
| 3,250,269 | 5/1966 | Sherock | 126/271 |
| 3,390,672 | 7/1968 | Snelling | 126/271 |
| 3,937,208 | 2/1976 | Katz | 126/271 |
| 3,989,031 | 11/1976 | Thomason et al. | 126/271 |

OTHER PUBLICATIONS

A. V. Chechetkin, "High Temperature Heat Carriers," Chapter 7, Pergamon Press (1963).

Primary Examiner—Kenneth W. Sprague
Assistant Examiner—James C. Yeung
Attorney, Agent, or Firm—B. J. Powell

[57] ABSTRACT

A modular solar collector system and method for solar radiation with a collector assembly defining a fluid flow channel therein exposed to solar radiation; a heat transfer fluid for flowing down the fluid flow channel to be heated directly or indirectly by the solar radiation where the heat transfer fluid has a fluid vapor pressure differential between the maximum and minimum temperatures to which said heat transfer fluid is exposed during flow down the fluid flow channel of less than about 0.3 psia and/or defines a wetting angle with respect to said solar radiation absorbing surface of less than about 50°; and means for supplying the heat transfer fluid to the upper end of the channel for the flow of the heat transfer fluid down the channel under the force of gravity to heat the transfer fluid.

27 Claims, 14 Drawing Figures

SOLAR COLLECTOR APPARATUS AND METHOD

BACKGROUND OF THE INVENTION

Flat plate solar collectors have been generally known for many years. Such flat plate solar collectors typically consist of a solar radiation absorbing member heated by solar radiation impressed thereon, a heat transfer fluid which is passed into contact with the solar radiation absorbing member to transfer the heat from the solar radiation absorbing member into the heat transfer fluid, and one or more generally transparent covers over the solar radiation absorbing member which admits incoming solar radiation while retarding thermal heat loss from the solar radiation absorbing member. Also, typically, an insulated enclosure is provided around the bottom and sides of the collector to minimize thermal heat loss. The solar radiation absorbing member is typically a metal plate painted or plated black such that about 90% of the solar radiation incident upon it will be absorbed and converted to heat therein.

One type of these prior art solar collectors employs the technique of trickling water over the solar radiation absorbing member which is tilted at an angle and generally faces the sun. This type collector was proposed in U.S. Pat. No. 1,101,001 and is commonly known as the trickle-type collector. This type collector has two serious drawbacks. The first drawback is that, when water is trickled over the solar radiation absorbing member, it may not wet the entire area of the member surface but instead runs down in streams or channels to seriously reduce the heat collection efficiency of the collector. The other problem with this type collector is that temperatures are readily reached in the solar radiation absorbing member to cause the water flowing along the member to be partially evaporated and then condensed on the cooler cover to thereby greatly increase the thermal heat loss due to the heat pipe effect and also to limit the amount of solar radiation that can reach the solar radiation absorbing member to be transferred to the water flowing over the solar radiation absorbing member. Attempts to solve some of the problems with the trickle-type collectors are shown in U.S. Pat. Nos. 3,145,707 and 3,215,134 which add an additional transparent inner flexible sheet between the collector cover and the solar radiation absorbing member and the inner sheet to prevent condensation on the inside of the collector cover. This type collector has become known as the Thomason collector. The Thomason collector, however, still suffers from the disadvantage that the water usually will not wet the entire area of the solar radiation absorbing member and continues to run down the solar radiation absorbing member in streams or channels to produce a continued reduction in collector efficiency. The use of the inner flexible sheet has also increased the original manufacturing cost of the collector.

Because of the inherent problems of the trickle-type and Thomason collectors, the closed channel type of solar collector has received more attention and consists of a metal coil, usually copper, which is fastened or soldered to the solar radiation absorbing member to serve as a passageway through which water or some other heat transfer fluid may be circulated to transfer the heat from the solar radiation absorbing member to a storage tank or some other heat operated device. Alternatively, the solar radiation absorbing member has been made of two channelled metal plates bonded together so as to provide a circuitous passageway between the plates through which the heat transfer fluid can flow. While these channel type collectors have proved to be quite successful in operation, they are relatively costly to manufacture thereby seriously limiting their commercial use. Additionally, these collectors also require considerable amount of supplemental power to provide the relatively high pumping pressure required to circulate the heat transfer fluid through the enclosed passageways.

Anothr factor which is seriously limiting the use of these prior art solar collectors is that each collector is usually made in a fixed size or must be custom made to any particular size thereby maintaining a relatively high cost of installation.

SUMMARY OF THE INVENTION

These and other problems and disadvantages associated with the prior art are overcome by the invention disclosed herein by providing an extremely simple solar collector system of the trickle type which uses a heat transfer fluid having a small wetting angle and a low vapor pressure, differential at the temperatures to which the heat transfer fluid is exposed in the unit. The small wetting angle of the heat transfer fluid causes it to spread out over the entire surface of the heated solar radiation absorbing member in order to maximize the amount of heat transferred from the solar radiation absorbing member to the heat transfer fluid. The low vapor pressure of the heat transfer fluid prevents its evaporation and recondensation on the collector cover in order to minimize the thermal heat loss associated with this evaporation process and to maximize the amount of solar radiation impressed on the solar radiation absorbing member. Further, the solar collector is made in modular form and may be extended or reduced in length as is desired using standard components. The solar collector may also be incorporated directly into the building structure with which it is to be used to minimize the manufacturing and installation costs.

The solar collection system comprises generally a collector with an elongate, angularly inclined, collector trough whose bottom wall serves as the solar radiation absorbing member with opposed upstanding side walls to define a fluid flow channel over which the heat transfer fluid flows under the force of gravity. A fluid supply header is provided at the upper end of the trough to uniformly distribute the heat transfer fluid over the width of the bottom wall of the trough and a return header is provided at the lower end of the trough which collects the heated fluid that has flowed down the bottom wall of the trough. One or more solar radiation transmitting covers are provided over the trough which allows the solar radiation to pass therethrough and be absorbed by the bottom wall of the trough to heat the bottom wall for transfer to the heat transfer fluid flowing over the bottom wall. The heat transfer fluid is selected to have a sufficiently small wetting angle to uniformly wet the bottom wall of the trough and to uniformly flow along the length thereof to be heated. Further, the heat transfer fluid is selected to have an extremely low vapor pressure differential at the temperatures to which the heat transfer fluid is exposed in the collector to prevent the loss of heat by evaporation and recondensation. It has been found that a number of different oils and silicone fluids exhibit the necessary small wetting angle and low vapor pressure differential to successfully operate the system of the invention.

These and other features and advantages of the invention disclosed herein will become more apparent upon consideration of the following specification and accompanying drawings wherein like characters of reference designate corresponding parts throughout the several views and in which:

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Figure 1:
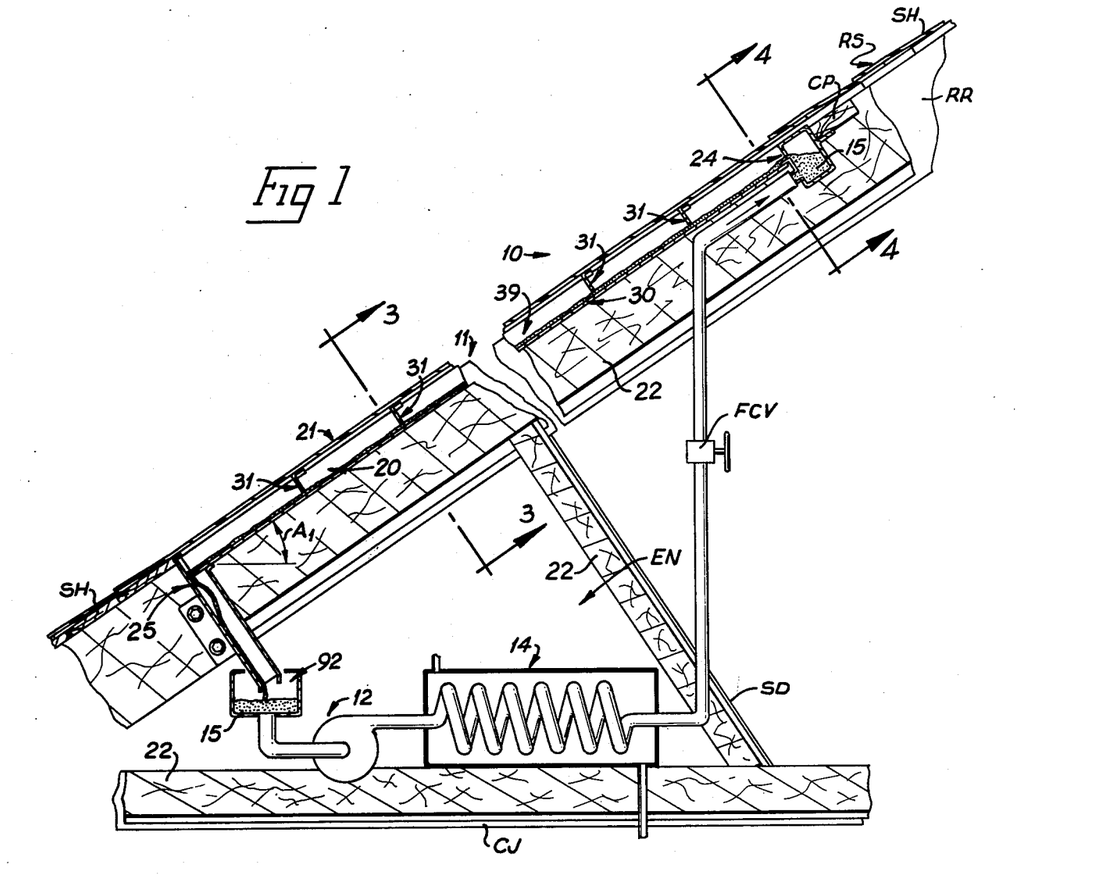
FIG. 1 is a schematic diagram illustrating one embodiment of the invention showing the solar collector in longitudinal cross-section.

As seen in FIG. 1, the solar collector system 10 includes a solar collector 11, a liquid pump 12 and a heat exchanger or heat storage device 14 with a heat transfer fluid 15 which flows from the top to the bottom of the solar collector 11 by gravity and is returned to the top of the collector by the liquid pump 12 after passage through the heat exchanger 14. The solar collector 11 is usually inclined at an angle $A_1$ so that it faces the sun to receive solar radiation therefrom and may be incorporated into the roof structure RS of a building or supported in a separate framework.

Figure 2:
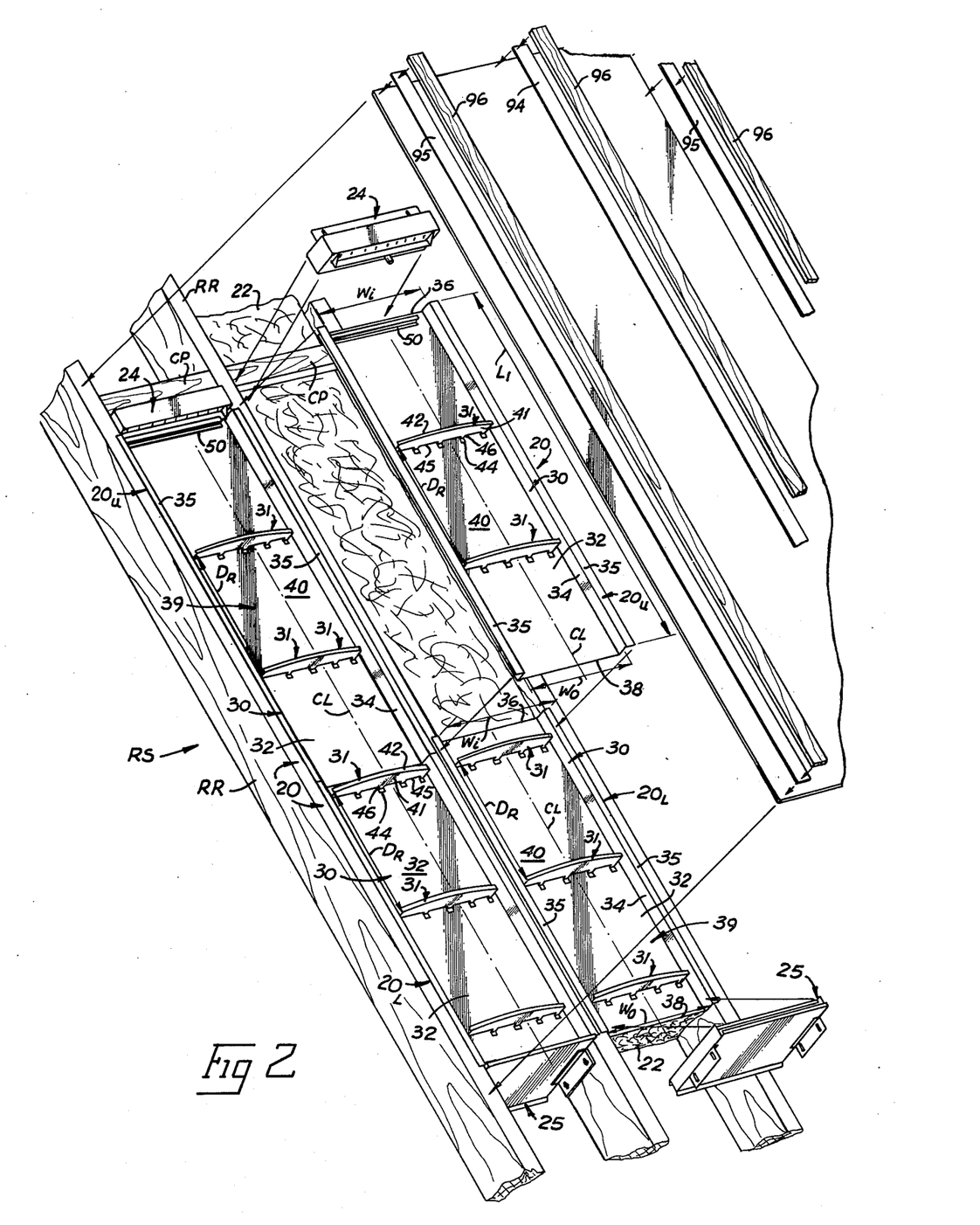
FIG. 2 is an exploded perspective view of the solar collector of the invention.

The solar collector 11 as best seen in FIGS. 1–8 includes generally a collector pan 20 defining a fluid flow channel along the length thereof and typically is painted or plated black on that side facing the sun to make it highly absorbent to solar radiation, one or more glass or plastic covers 21 which close the fluid flow channel in pan 20 and serve to transmit the received solar radiation into the collection, a suitable insulating material 22 which prevents heat loss in the other directions facing away from the sun, a fluid supply header 24 which serves to distribute a thin layer of the heat transfer fluid 15 uniformly over the fluid flow channel in the collector pan 20, and a return header 25 which collects the heated fluid 15 after it has passed along the collector pan 20 to be heated and returns it to the liquid circulating pump 12. The collector 11 may include a plurality of collector pans 20 as seen in FIG. 2 serially connected together to form a collector 11 of any desired length.

Referring now to FIGS. 2, 3, 5 and 6, it will be seen that each collector pan 20 includes an elongate trough 30 with a plurality of transversely extending ribs 31 thereon. Because more than one collector pan may be used, the upper collector pan has been designated $20_U$ and the lower collector pan has been designated $20_L$ in FIG. 2 for clarity. Basically, both the upper and lower collector pans $20_U$ and $20_L$ have the same construction and only the upper pan $20_U$ will be described in detail with like reference numbers applied to the lower pan $20_L$.

Figure 3:
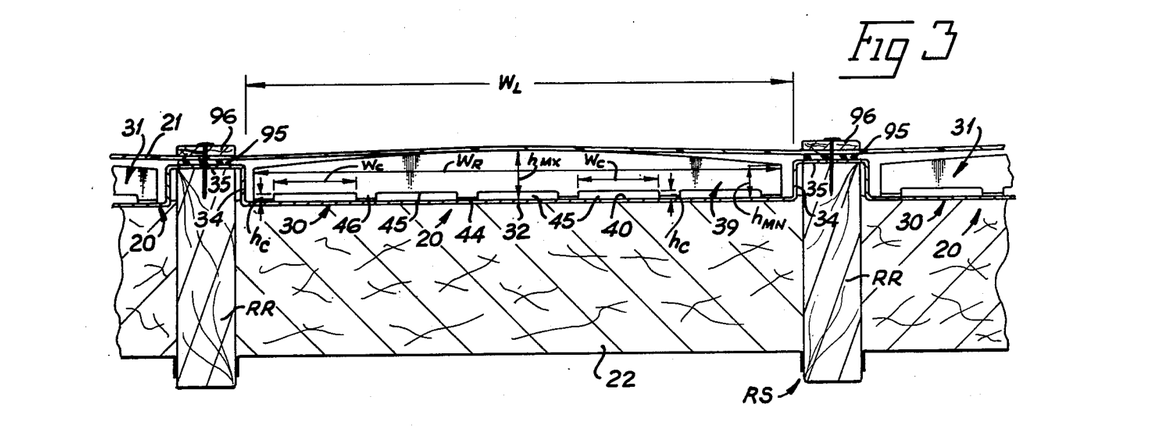
FIG. 3 is an enlarged transverse cross-sectional view of the solar collector taken along line 3—3 in FIG. 1.

The trough 30 of each pan 20 has a centerline CL seen in FIG. 2 and a generally U-shaped transverse cross-section along its length $L_1$ best seen in FIG. 2. Trough 30 as best seen in FIG. 3 has a generally flat bottom wall 32, a pair of opposed upstanding side walls 34 integral with opposite edges of the bottom wall 32 along the length of the trough, and a pair of opposed, outwardly extending support flanges 35 integral with the top edges of the side walls 34 along their length. The side walls 34 may be normal to bottom wall 32 and flanges 35 are generally parallel to bottom wall 32. The flanges 35 project outwardly from the side walls 34 and serve to support the collector pan 20 as will become more apparent.

The upper upstream end 36 of each trough 30 has an inside width $w_i$ between the inside surface of side walls 34 while the lower downstream end 38 of each trough 30 has an outside width $w_o$ between the outside surfaces of side walls 34 as best seen in FIG. 2 substantially equal to width $w_i$ so that the lower end of each trough 30 will fit in the upper end of another trough 30 as seen in FIG. 2. This allows a plurality of the troughs 30 to fit together serially so that a longer collector can be fabricated using standard components as will become more apparent.

The side walls 34 and bottom wall 32 of trough 30 define an open top fluid flow channel 39 along the length of trough 30. The heat transfer fluid flows over the bottom wall 32 within channel 39 under the force of gravity. Usually, the upper solar radiation absorbing surface 40 of bottom wall 32 is painted or plated black to readily absorb almost all of the slar radiation impressed thereon to head the bottom wall 32.

Figure 5:
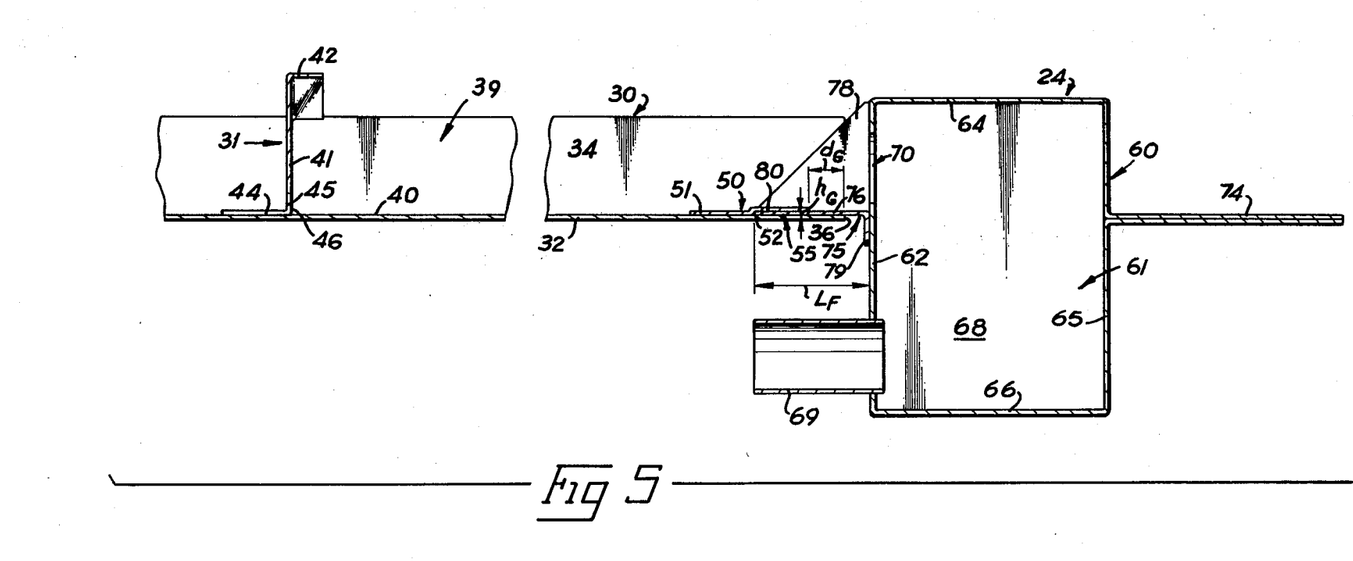
FIG. 5 is a cross-sectional view of the upper end of the invention including the supply header taken along line 5—5 in FIG. 4.
Figure 9:
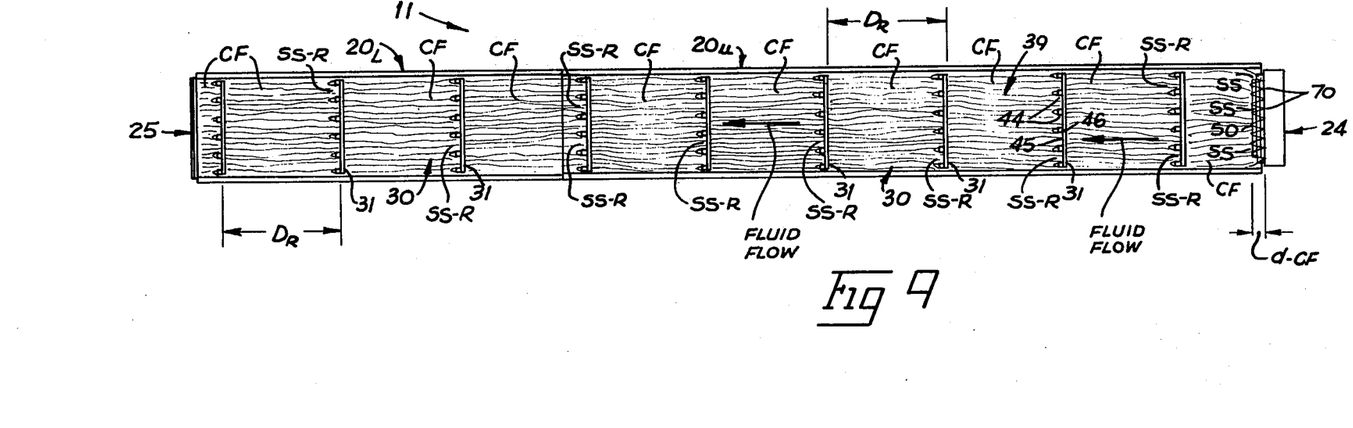
FIG. 9 is a top view of the solar collector illustrating the flow of the heat transfer fluid thereover.

Each collector pan 20 has a plurality of the ribs 31 mounted on the bottom wall 32 of the elongate trough 30 which are oriented generally normal to the centerline CL of the trough 30 within a prescribed distance $D_R$ seen in FIGS. 2 and 9 between each of the ribs 31. The ribs 31 have the same construction and therefore only one rib 31 will be described in detail with like reference numbers applied to the other ribs. Each rib 31 as seen in FIGS. 3 and 5 has a width $w_R$ which usually is less than the inside width $w_i$ between the side walls 34 and is centered across the width of the bottom wall 32 of the trough 30. Each rib 31 has a central web 41 which is oriented generally normal to the solar heat absorbing surface 40 of the bottom wall 32 of the trough 30 and normal to the centerline CL. The upper edge of the web 41 may be arcuate as seen in FIG. 3 and is provided with a support lip 42, best seen in FIG. 5, generally normal to the central web 41 to support the collector cover 21 over the fluid flow channel 39 as will become apparent. The central web 41 has a minimum height $h_{MN}$ at its opposite ends as seen in FIG. 3 about equal to the height of the side walls 34 and a maximum height $h_{MX}$ at its center which is usually slightly higher than the side walls 34 to slightly curve the collector cover 21 if it is flexible as will become more apparent. The lower edge of the central web 41 is provided with a plurality of attachment tabs 44 seen in FIGS. 3 and 5 which extend outwardly from the central web 41 generally normal thereto for attachment to the upper solar heat absorbing surface 40 of the bottom wall 32 of trough 30 by conventional means such as welding. The lower edge of the central web 41 is provided with a plurality of cutouts 45 therethrough best seen in FIG. 3 between the attachment tabs 44. The cutouts 45 have a prescribed width $w_C$ and prescribed height $h_C$ to allow the heat transfer fluid to pass under the ribs 31 around the attachment sections 46 connecting the web 41 proper to the attachment tabs 34. It will be noted that the width and number of cutouts 45 are such that the heat transfer fluid can flow along over the solar heat absorbing surface 40 on the bottom wall 32 of the trough 30 and through the cutouts 45 over the major portion of the width of the solar radiation absorbing surface 40. The height $h_C$ of the cutouts 45 is selected to be greater than the maximum film thickness that will be encountered in the heat transfer fluid as it flows along the surface 40 of the bottom wall 32 as will become more apparent. The ribs 31 serve primarily to keep the solar heat absorbing surface 40 on the bottom wall 32 substantially flat and to support the cover 21. The ribs 31 also serve to reduce convective currents in the air in the channel 39 between the cover 21 and the film of heat transfer fluid 15 flowing down the surface 40.

The upstream end 36 of trough 30 in upper collector pan $20_U$ may be provided with a grip strip 50 seen in FIGS. 2, 5 and 9 carried on the bottom wall 32 normal to centerline CL. The grip strip 50 serves to facilitate the attachment of the upper collector pan $20_U$ to the supply header 24 as will become more apparent. The grip strip 50 includes an attachment flange 51 attached to the solar heat absorbing surface 40 of the bottom wall 32, a central spacer section 52 integral with the attachment flange 51 and generally normal to the surface 40, and an upper engagement lip 54 integral with the upper edge of the spacer section 52 and extending from section 52 opposite flange 51 over the surface 40 of the bottom wall 32 generally parallel therewith and spaced thereabove a prescribed height $h_G$. The upstream end of lip 54 is spaced downstream of the end 36 of trough 30 a prescribed distance $d_G$. The supply header 24 then fits within the space 55 between the connecton lip 54 and the bottom wall 32 to connect the upstream end 36 of trough 30 to the header 34 as will become more apparent. The grip strip 50 may be replaced with a grip strip on header 24 as will become more apparent.

Figure 4:
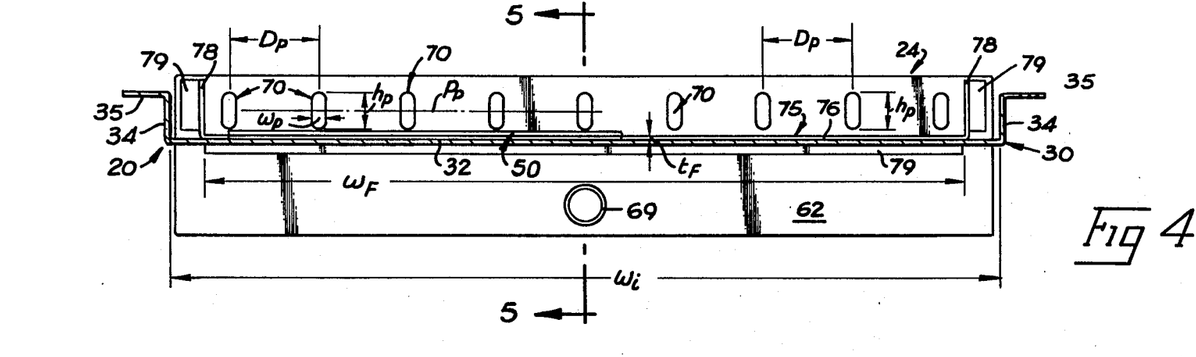
FIG. 4 is an enlarged discharge side view of the supply header of the invention taken along line 4—4 in FIG. 1.

The supply header 24 best seen in FIGS. 4 and 5 includes generally a housing 60 defining a heat transfer fluid reservoir 61 therein which receives the heat transfer fluid under the pressure of pump 12 for distribution in the fluid flow channel 39 in the collector pan 20. The housing 60 generally includes a front wall 62, a top wall 64, a rear wall 65, a bottom wall 66, and a pair of end walls 68 which connect the walls 62 and 64–66 at opposite ends thereof to define the reservoir 61. The lower portion of the housing 60 is provided with a fluid inlet tube 69, here shown as being positioned in the lower portion of the front wall 62, through which the heat transfer fluid is supplied to the reservoir 61.

The heat transfer fluid is discharged from the reservoir 61 through a plurality of outlet ports 70 best seen in FIG. 4 in the upper portion of the front wall 62 which communicate with the reservoir 61. The outlet ports 70 are arranged along a common path $P_P$ extending across the width of the header 24 with the path $P_P$ being generally parallel to the solar radiation absorbing surface 40 in the trough 30 of the collector pan $20_U$. The ports 70 are spaced across the width of the header 24 with a prescribed distance $D_P$ therebetween. Each of the ports 70 has a prescribed width $w_P$ and a prescribed height $h_P$ which will determine the total volume flow rate possible from the reservoir 61. Thus, the width $w_P$ and the height $h_P$ are selected so that the total discharge opening area of the ports 70 is at least great enough to provide the maximum volume flow rate for the heat transfer fluid that may be required in the operation of the collector system. The use of elongate ports 70 in the header 24 tends to reduce the need for precise leveling of the inlet header 24 to assure substantially uniform flow across the width of the solar radiation absorbing surface 40. This is because a change in the level of the heat transfer fluid in the reservoir 61 across the width of the header 24 generates less of an increase in flow difference between one side of the header 24 and the other side of the header than would be encountered if a single opening extending all the way across the width of the header 24 was used.

Figure 8:
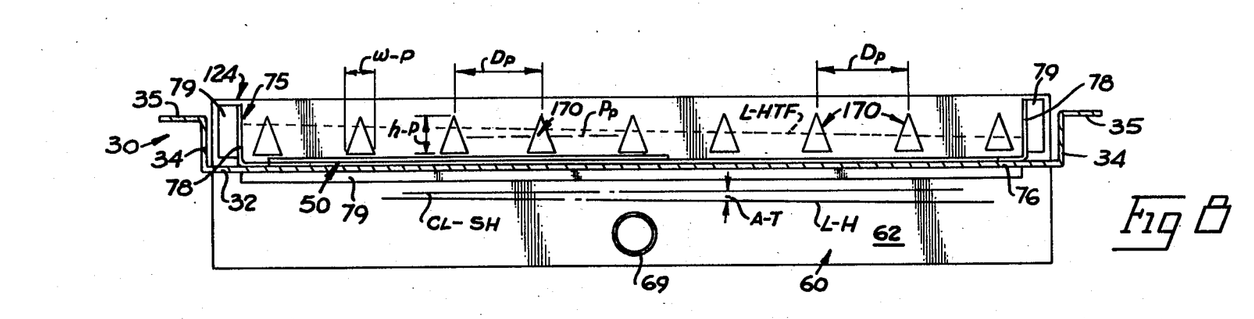
FIG. 8 is a view similar to FIG. 4 showing an alternate construction for the supply header.

Alternatively the discharge ports from the supply header 24 may have a generally triangular shape as shown by ports 170 in FIG. 8. The rest of the header 124 is the same as header 24 and has like reference numerals applied thereto. The ports 170 are also arranged along the common path $P_P$ with the prescribed distance $D_P$ therebetween. Each port 170 tapers inwardly from its bottom to its top with a maximum height h-P along its vertical axis, and a maximum width w-P at its lower end. The width w-P and height h-P are selected so that the total discharge opening area of the ports 170 is at least great enough to provide the maximum flow rate for the heat transfer fluid that may be required in the operation of the collector system. The use of the tapered ports 170 minimize the variations in fluid flow rate through the ports across the width of the collector pan when the header 24 is not exactly level. This feature is best seen in FIG. 8 where the header 124 is shown tilted with respect to the horizontal seen as line L-H. The centerline CL-SH of the supply header 124 defines an angle A-T with line L-H. Since the heat transfer fluid level L-HTF in the reservoir in header 124, seen as a dashed line in FIG. 8, is always horizontally level, it will cross ports 170 at different heights from their lower ends. Because the ports 170 are tapered, less of an increase in flow difference between one side of the header 124 and the other side of the header is generated than would be encountered if a single opening extending all the way across the width of the header 124 was used. Actually, the system of the invention can tolerate a considerable degree of nonuniformity in flow thereacross. The important consideration is that the minimum flow rate be great enough to cool the surface 40 with an acceptable temperature gradient while the maximum flow rate be small enough to prevent splashing waves in the flow down the surface 40.

A discharge ledge 75 seen in FIGS. 4 and 5 is provided on the discharge side of the front wall 62 under the ports 70 to provide a connection between the header 24 and the upstream end 36 of the trough 30 of collector pan $20_U$. The discharge ledge 75 includes generally a bottom flange 76 with a prescribed width $w_F$ greater than the distance between the outermost ports 70 and less than the distance $w_i$ between the side walls 24 of the trough 30. The flange 76 has a length $L_F$ as will become more apparent. A pair of upturned end flanges 78 are provided at opposite ends of the bottom flange 76 and are integral therewith. The end flanges 78 are oriented generally normal to the bottom flange 76 with the bottom flange 76 being parallel to the path $P_P$ of the ports 70. Appropriate mounting tabs 79 are provided along the edges of the bottom flange 76 and the end flanges 78 for attachment to the front wall 62 of the housing 60. The thickness $t_F$ of the bottom flange 76 is such that the bottom flange 76 will just be slidably received in the space 55 between the grip strip 50 and the solar radiation absorbing surface 40 of the bottom wall 32 on the trough 30. It will further be noted that the grip strip 50 is positioned the prescribed distance $d_G$ downstream of the upstream end 36 of the trough 30 so that the upstream end 36 of the trough 30 will always extend past the downstream edge 80 of the bottom flange 76 on the discharge ledge 75 sufficiently to prevent leakage. This will insure that all of the heat transfer fluid being distributed out of the supply header 24 will pass along the fluid flow channel 39 over the solar heat absorbing surface 40. The length $L_F$ of the bottom flange 76 is greater than the distance $d_G$ so that the flange 76 will project into space 55 before the upper end 36 of trough 30 abuts the housing 60 of header 24. Alternatively, the grip strip 50 may be eliminated on trough 30 and an appropriate grip strip (not shown) carried by header 24 to hold the upper end 36 of trough 30. A convenient attachment flange 74 is provided on the back wall 65 of housing 60 and extends across the width thereof. Flange 74 serves to mount header 24 as will become more apparent.

Figure 6:
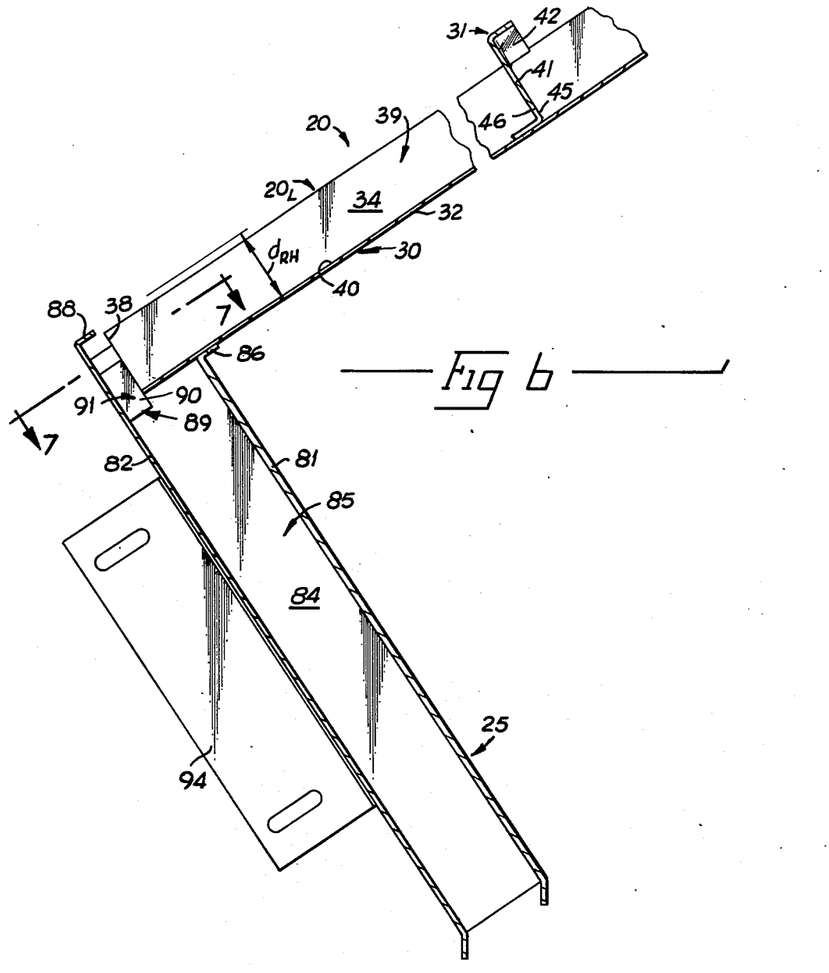
FIG. 6 is an enlarged longitudinal cross-sectional view of the lower end of the collector of the invention.
Figure 7:
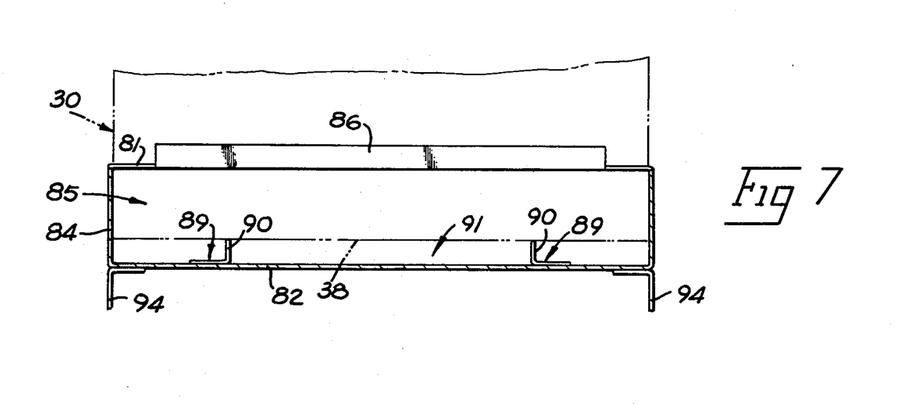
FIG. 7 is a cross-sectional view of the return header taken along line 7—7 in FIG. 6.

The return header 25 as best seen in FIGS. 6 and 7 receives the heat transfer fluid after it has flowed down channel 39 under the influence of gravity and has been heated by the bottom wall 32 of trough 30. Header 25 includes spaced apart front and back walls 81 and 82 joined along opposite edges by end walls 84 to define a collection passage 85 therethrough with a generally rectilinear cross-section open at its upper and lower ends. The front wall 81 terminates a prescribed distance $d_{RH}$ below the upper edge of back wall 82 which is slightly greater than the total height of trough 30. The upper edge of the front wall 81 is provided with an outwardly extending support lip 86 normal to wall 81 and the upper edge of back wall 82 is provided with a support lip 88 normal to wall 82 which projects over a portion of passage 85. The header 25 is oriented so that the walls 81 and 82 are generally normal to the bottom wall 32 of trough 30 an the lower end 38 of trough 30 projects into the passage 85 over lip 86 and under lip 88.

To insure that the downstream end 38 of trough 30 does not butt against the back wall 82 of header 25 to restrict the flow of fluid, a pair of spacers 89 are mounted on the back wall 82 of header 25, each having a lip 90 oriented normal to bottom wall 32 on trough 30 and in alignment therewith. Thus, the downstream end of bottom wall 32 on trough 30 abuts lips 90 as seen in FIG. 6 to provide a discharge clearance space 91 so that the heat transfer fluid can flow out of the downstream end 38 of trough 30, through passage 85 in header 25, and into a receiver 92 seen in FIG. 1 so that the heated fluid 15 can be pumped by pump 12 through heat exchanger 14 back to the supply header 24. Mounting brackets 94 are provided on opposite sides of header 25 to mount same.

The cover 21 is a relatively thin sheet of material which will transmit almost all of the solar radiant energy incident thereon through the cover 21 into the channel 39 in trough 30 so that the transmitted solar radiation is impressed on the solar radiation absorbing surface 40 in trough 30. While a number of different materials have this capability, a fiber glass reinforced polyester plastic sheet has been found quite satisfactory. Such sheet material is commercially available from Kalwall Corporation of Manchester, New Hampshire, and transmits about 90% of the solar energy incident on it therethrough. The cover 21 is sufficiently long to cover the channel 39 in trough 30 and is wider than channel 39. Where multiple collector pan 20 are used in parallel, the cover 21 may be made sufficiently wide to span more than one collector pan 20 as seen in FIG. 2. The cover 21 is placed over the supply header 24, trough 30 and return header 25 so that it is supported by the lips 42 on ribs 31 as seen in FIG. 5. The opposite side edges of cover 21 are sealed with sealing gaskets 95 and held in place by clamping strips 96 with conventional fasteners as seen in FIG. 3.

It is to be understood that more than one cover 21 may be used to cover the collector pans 20 with the covers overlying each other. When more than one cover 21 is used, an air space is usually left between overlying covers to reduce the thermal and radiant heat loss from the fluid flow channel 39. The use of these overlying covers allows the maximum available output temperature in the heat transfer fluid 15 to be raised without excessive heat loss.

Figure 10:
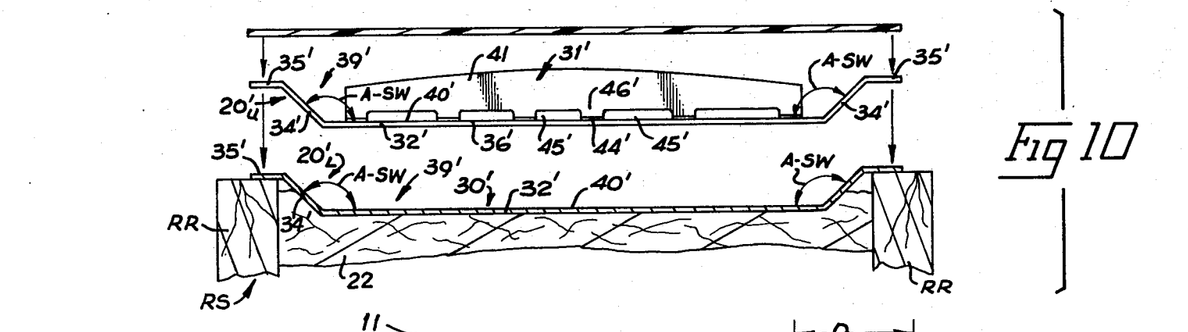
FIG. 10 is an exploded transverse cross-sectional view taken at the joint between modified upper and lower collector pan assemblies.
Figure 11:
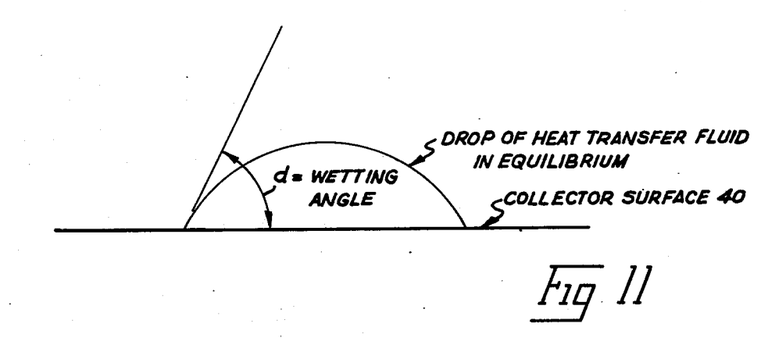
FIG. 11 is a schematic view illustrating wetting angle.

The troughs 30 may also be made so that they can be overlapped while keeping their width substantially constant along their lengths. Such troughs are illustrated in FIG. 10 and designated as troughs 30'. These troughs 30' have a generally flat bottom wall 32', a pair of opposed side walls 34' integral with opposite edges of bottom wall 32', and a pair of opposed, outwardly extending support flanges 55' integral with the upper edges of the side walls 34'. Unlike side walls 34 of trough 30, the side walls 34' angle outwardly from the bottom wall 32' at an obtuse angle A-SW with respect to the bottom wall. Thus, when the lower end 38' of one of the troughs 30' is overlapped over the upper end 36' of another trough 30, these overlapping ends will nest within each other to form a liquid tight joint. Such a construction allows the troughs 30' to be cut to any desired length and still be overlapped serially to form a collector of any desired length.

The bottom walls 32' define the solar radiation absorbing surfaces 40' thereon and the fluid flow channel 39' therein similar to troughs 30. Ribs 31' similar to ribs 31 are also used with troughs 30' to complete the collector pans. The cover 21 is used to cover the troughs 30' similar to troughs 30.

INSTALLATION

As best seen in FIGS. 1-3, the solar collector 11 may be installed in the roof structure RS of the building on which it is to be used provided the roof angle and orientation are adequate to orient the collector. Normally a section of the roof structure is selected which generally faces the sun and is inclined so that the tilt angle $A_1$ of the collector is about equal to the latitude of the location of the building. Each collector 11 is generally mounted between the roof rafters RR best seen in FIG. 2. Since the center-to-center spacing of the rafters RR is generally standardized, the width of the collector 11 can likewise be standardized.

The maximum width between the outside surface of the side walls 34 on each trough 30 of the collector pans 20 is such that the side walls 34 will just fit between adjacent rafters RR while the support flanges 35 project out over the top edges of rafters RR to support the collector pans 20 therebetween. The width of the supply header 24 is such that it will just fit between the rafters RR at the upper end of the collector pan 20 with the discharge ledge 75 inserted under the grip strip 50. The header 24 may be mounted on a cross-piece CP between the rafters RR through the attachment flange 74 on header 24 as seen in FIG. 1. The return header 25 also has a width so that it will just fit between the rafters RR at the lower end of collector pan 20 with the pan 20 projecting into the passage 85 to abut spacers 89 in header 25. The header 25 is mounted on rafters RR by brackets 94 so that the heat transfer fluid flowing down the collector 11 passes out of the header 25 interiorly of the roof structure.

The sealing gaskets 95 are placed over the support flanges 35 on collector pans 20 and the cover 21 is placed over the pans 20. The clamping strips 96 are fastened to the rafters RR over the cover 21 to hold it in place with the cover 21 being supported on the ribs 31 in pans 20 and the gaskets 95. The upper end of the cover 21 extends under the roof shingles SH above the collector 11 and over the roof shingles SH below collector 11 as see in FIG. 1 to provide a watertight roof.

Where more length is needed in the collector 11 than the length of one collector pan 20, one simply uses more collector pans to extend the length as seen in FIG. 2. The upper end of the lower collector pan $20_L$ seen in FIG. 2 is simply positioned under the lower end of the upper collector pan $20_U$. The pan $20_U$ will fit in pan $20_L$ since the side walls 34 taper inwarly from their upper to lower ends as already explained to provide a continuous fluid flow channel 39 along the entire length of pans 20. Thus, a collector 11 can be made of any desired length. From a practical standpoint, collectors 11 will usually be anywhere from about 8 to about 50 feet in length. The pans 20 will usually be about 4–8 feet in length for ease in manufacture and handling.

Insulation 22 is positioned under the collector pans 20 as seen in FIG. 1 and attached to the rafters RR. To simplify the insulation of the fluid receiver 92, the liquid pump 12 and the heat exchanger 14, studs SD may be positioned between the rafters RR and ceiling joists CJ as seen in FIG. 1 inboard of the equipment. Insulation 22 is then positioned between the studs SD and also between the ceiling joists CJ if they are not already insulated to define an insulated enclosure EN about the equipment.

Another feature of this invention is that any number of individual solar collectors 11 may be connected together in parallel and that the length of each collector may be easily changed or adjusted. In parallel operation, the heat transer fluid 15 is supplied to each supply header 24 through a flow control valve FCV seen in FIG. 1 connected to a master supply line from the pump 12. The flow control valves FCV are individually adjusted to balance the flow of heat transfer fluid across the array of solar collectors 11.

HEAT TRANSFER FLUID

The characteristics of the heat transfer fluid 15 are most important in the operation of a trickle-type solar collector such as that of this invention. Two basic criteria are required, (1) that the heat transfer fluid must substantially wet the entire solar radiation absorbing surface of the solar collector with a stable film and, (2) that the heat transfer fluid should not be vaporized in the operating temperature range of the collector.

The ability of the heat trasfer fluid to wet the solar heat absorbing surface of the solar collector has been found to be a function of wetting angle $\alpha$ and the dimensionless Reynolds number $R_e$ of the fluid flowing down the solar heat absorbing surface. Wetting angle $\alpha$ is the included angle defined by the edge of a drop of heat transfer fluid with a flat horizontal surface of the same material and finish as the solar heat absorbing surface 40 on the collector pans 20 as seen in FIG. 10. Because the ability of the heat trasfer fluid to wet or cover the surface 40 is dependent not only on the surface tension of the fluid but also on the material and the finish of the surface on which the fluid is supported, wetting angle $\alpha$ is the best indication of the wetting ability since it takes all of these factors into effect. Reynolds number $R_e$ is defined by the equation:

$$R_e = \dot{m}/\mu$$

where:

$\dot{m}$ = fluid mass flow rate per unit width down the collector ($lb_m$/sec-ft)

$\mu$ = fluid viscosity ($lb_m$/ft-sec)

Figure 12:
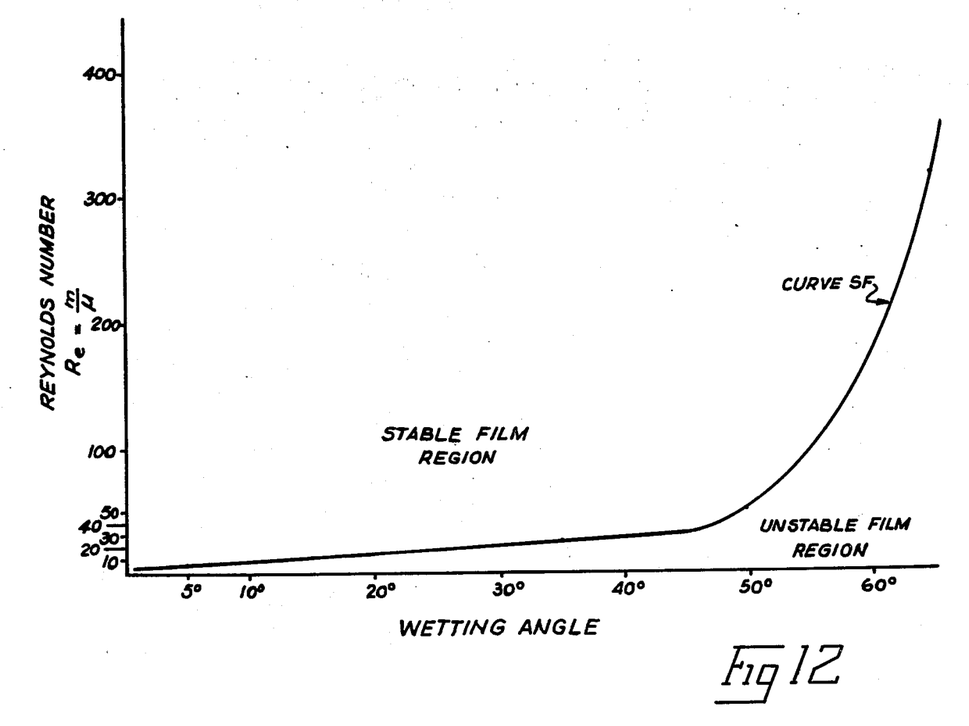
FIG. 12 is a graph illustrating the relationship between Reynolds Number and wetting angle to maintain a stable heat transfer fluid film in a solar collector.

The relationship between Reynolds number $R_e$ and wetting angle $\alpha$ is best illustrated in FIG. 12. The curve SF shown in FIG. 12 is a plot of the points at which a stable film of heat transfer fluid which completely covers the solar radiation absorbing surface is achieved. It will be noted that a fully stable unbroken fluid film is achieved in that area above curve SF while the fluid film below curve SF is not fully stable. Since the amount of heat transferred from the heated solar radiation absorbing surface 40 to the heat transfer fluid is maximized when a fully stable fluid film is present, one should keep the Reynolds number $R_e$ above curve SF in FIG. 12. On the other hand, the higher the Reynolds number $R_e$, the greater is the tendency of the fluid film to form waves or ripples therein that may result in the fluid splashing onto the other surfaces of the collector. This also results in lower collection efficiency. To minimize the formation of waves or ripples in the fluid film flowing down the solar radiation absorbing surface, it has been found that usually the Reynolds number $R_e$ should not exceed about 100 and should be as low as possible. From FIG. 12, it will be seen that curve SF starts rising at a rapidly increasing slope when the wetting angle $\alpha$ of the heat transfer fluid exceeds 50° and very quickly requires a Reynolds number $R_e$ greater than 100 to achieve a fully stable fluid film. Therefore, the wetting angle $\alpha$ of the heat transfer fluid 15 should not exceed 50° and preferably should be lower than 10°. It will further be noted that the stable fluid film criteria is independent of the tilt angle $A_1$.

If the heat transfer fluid 15 is heated sufficient to be evaporated by the solar radiation absorbing surface 40, the evaporated fluid will then be subsequently condensed on the lower surface of the cover 21. This causes a high thermal heat loss from the solar radiation absorbing surface 40 to cover 21 for dissapation into the atmosphere through a heat pipe effect. The heat transfer fluid condensing on the back of cover 21 also partially blocks the incoming solar radiation from reaching the solar radiation absorbing surface 40 to further reduce the collection efficiency of the collector.

Figure 13:
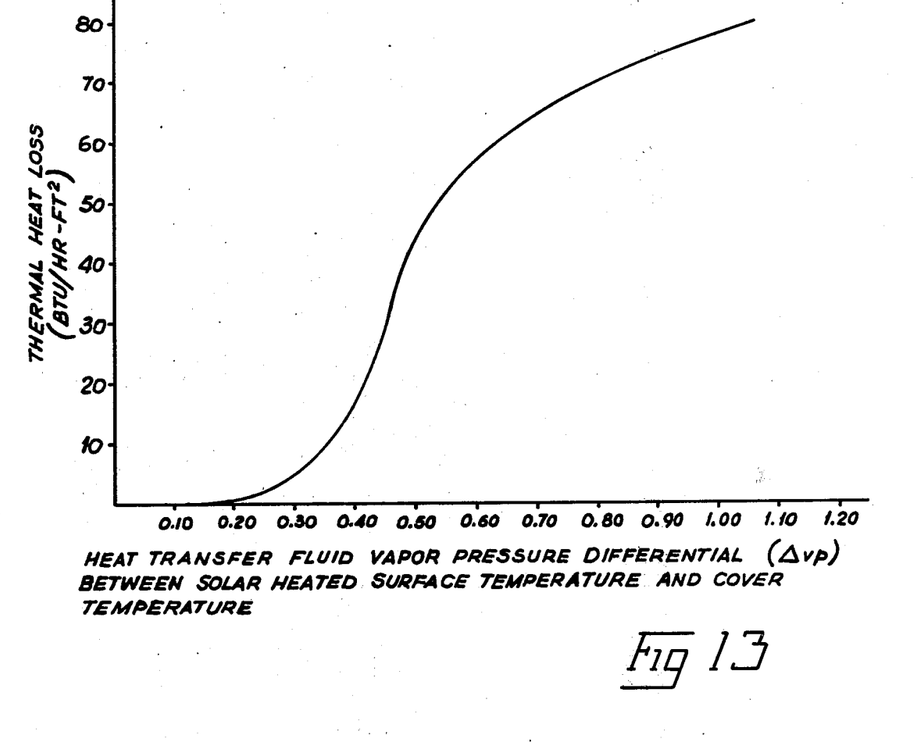
FIG. 13 is a graph illustrating the relationship between thermal heat loss and vapor pressure differential on the heat transfer fluid; and, FIG. 14 is a graph comparing the collection efficiency of the invention with the prior art.

The parameter which controls the thermal heat loss by evaporation and subsequent condensation on the cover is the difference between the heat transfer fluid vapor pressure at the highest temperature to which the heat transfer fluid is exposed and the lowest temperature to which the heat transfer fluid is exposed as it flows down the collector. The highest temperature for the collector illustrated is that of the solar radiation absorbing surface 40 while the lowest temperature is that of the inside surface of the cover 21 which directly overlies the heat transfer fluid as it flows down the surface 40. For sake of simplicity the difference in vapor pressures will be referred to hereinafter as the vapor pressure differential $\Delta VP$ of the heat transfer fluid. The thermal heat loss $Q_{loss}$ by evaporation and condensation becomes significant when the vapor pressure differential $\Delta VP$ of the heat trasfer fluid exceeds about 0.3 psia as seen in FIG. 13. Thus, the vapor pressure differential $\Delta VP$ should be less than about 0.3 psia and preferably should be less than about 0.15 psia.

Based on these criteria, it will be seen that the almost exclusively used prior art heat transfer fluid, water, does not meet the criteria set forth above. On the other hand, many mineral and synthetic fluids and oils, especially silicone fluids, meet these criteria. These fluids and oils may also be obtained which are desirably fire resistant, non-toxic, non-corrosive and have low oxidation characteristics.

The viscosity characteristics of the heat transfer fluid 15 are also important to the successful operation of the collector system of the invention. On the one hand, the viscosity of the heat transfer fluid must be sufficiently high at the maximum operating temperature of the collector system in order to maintain the Reynolds number sufficiently low to prevent undesirable waves and splashing in the fluid film. On the other hand, the viscosity of the heat transfer fluid must be sufficiently low at the coldest temperature associated with the collector system to allow the heat transfer fluid to be pumped without undesirably high pumping losses. The silicone fluids mentioned above are especially suited for the heat transfer fluid because of their very uniform viscosity-temperature characteristics. It is to be understood that any heat transfer fluid may be used which meets the above requirements as to wetting angle $\alpha$ and vapor pressure differential $\Delta VP$. Usually, the heat transfer fluid 15 will have a viscosity range of about 0.0007–0.050 $lb_m$/ft-sec over the operating temperature range of the collector system.

Figure 14:
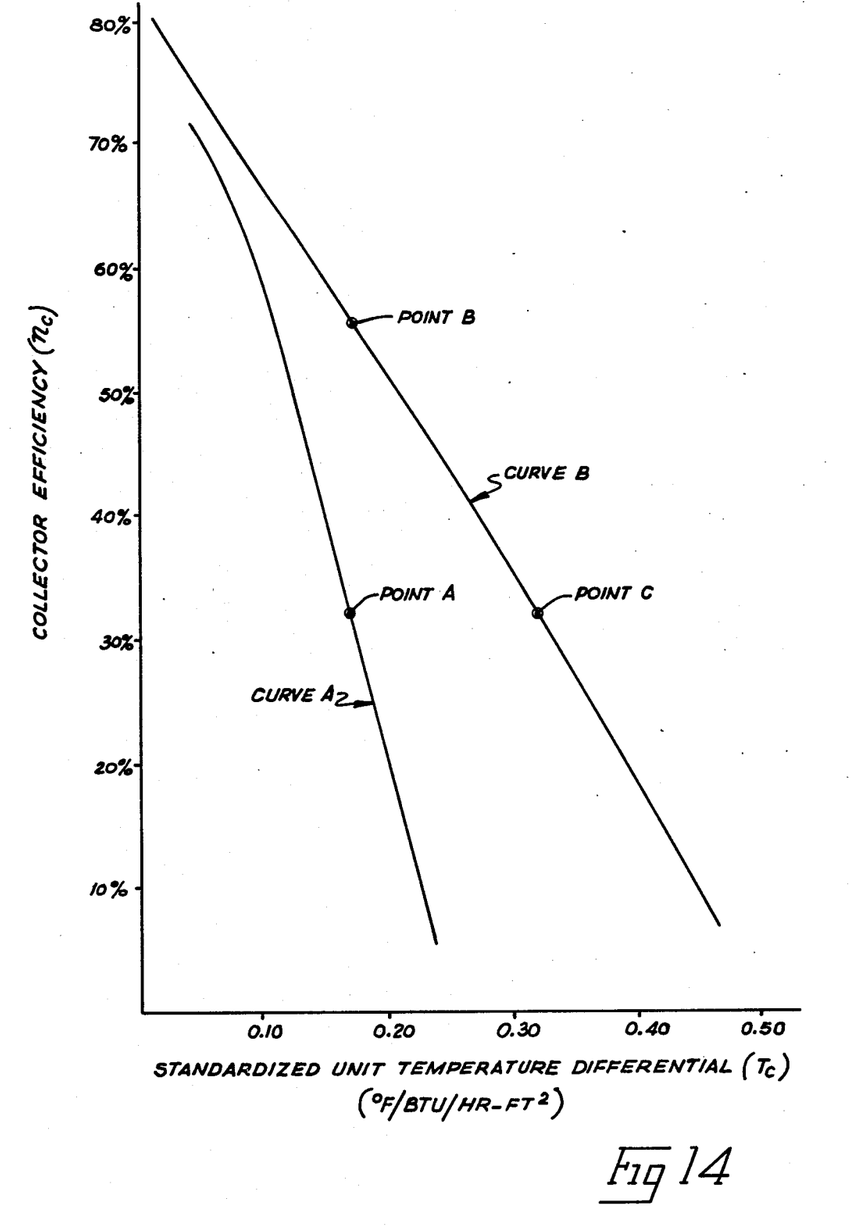

The resulting differences between the use of the prior art heat transfer fluid, water, and a heat transfer fluid 15 coming within the above criteria can best be illustrated by reference to FIG. 14 and attached Table I. The particular heat transfer fluid 15 selected for comparison is dimethyl silicone. In FIG. 14, Curve A indicates the collection efficiency of water as the heat transfer fluid while Curve B indicates the collection efficiency of dimethyl silicone as the heat transfer fluid. The ordinate is the collection efficiency $\eta_c$ and the abscissa is the standardized unit temperature differential $\tau_c$ of the heat transfer fluid as it flows through the collector. The collection efficiency $\eta_c$ is defined by:

$$\eta_c = (\dot{Q}coll/\dot{Q}solar) \times 100$$

where
  $\dot{Q}coll$ = heat output of collector fluid (Btu/hr-ft$^2$)
  $\dot{Q}solar$ = Insolation = Solar radiation impressed on collector (Btu/hr-ft$^2$)

The standardized unit temperature differential $\tau_c$ is defined by:

$$\tau_c = (T_{af} - T_{amb})/\dot{Q}solar$$

where
  $T_{af}$ = average heat transfer fluid temperature as it flows over the length of the collector (° F)
  $T_{amb}$ = ambient air temperature (° F)

Because the heat transfer between the solar radiation absorbing surface 40 and the heat transfer fluid 15 in the collector 11 shown is good, the temperature $T_{af}$ is also the average temperature of the surface 40. The standardized unit temperature differential $\tau_c$ allows the use of one curve even though the received solar radiation varies.

As seen in FIG. 14, the collection efficiency $\eta_c$ using water as the heat transfer fluid is considerably lower than that using dimethyl silicone as the heat transfer fluid at the same value of the temperature differential $\tau_c$. For instance, if the ambient temperature $T_{amb}$ is 50° F, the average heat transfer fluid temperature $T_{af}$ is 100° F and the received solar radiation $\dot{Q}solar$ is 300 Btu/hr-ft$^2$, the standardized unit temperature differential $\tau_c$ would be 0.167° F/Btu/hr-ft$^2$. Referring to FIG. 14, this value for the temperature differential $\tau_c$ shows that water would have a collection efficiency $\eta_c$ of only 32% at Point A on Curve A while dimethyl silicone has a collection efficiency of over 55% at Point B on Curve B. This would permit about a 42% reduction in collector area to supply the same quantity of heat output Qcoll at the temperature $T_{coll}$ or temperature differential $\tau_c$ given.

On the other hand, the same efficiency can be achieved with dimethyl silicon as can be achieved with water but at a much higher average heat transfer fluid temperature $T_{af}$. For instance, in the above example where the ambient temperature $T_{amb}$ is about 50° F and the insolation $\dot{Q}_{solar}$ is about 300 Btu/hr-ft$^2$, the collection efficiency could be maintained at about 32%, the same as water, with the average heat transfer fluid temperature $T_{af}$ at about 145° F as shown by Point C on Curve B using dimethyl silicone or an increase of about 45% in the output temperature of the heated dimethyl silicone. It will further be noted that water reaches a collection cutoff value (i.e. where $\eta_c \approx 0$) at a much lower value of temperature differential $\tau_c$ than the heat transfer fluid 15 of the invention.

The equipment which the solar collector is driving determines the required output temperature in the heat transfer fluid. In some cases, the output temperature can be relatively low thus permitting a higher percentage of the incoming solar radiation to be collected by the dimethyl silicone at the same temperature as is available from water. Where the output temperature must be high such as is the case with absorption type refrigeration or air conditioning systems, the same efficiency as is available with water can be obtained with dimethyl silicone but at a much higher temperature.

The formation of the film of heat transfer fluid 15 which meets the above requirements is illustrated in FIG. 9. The heat transfer fluid 15 is discharged in separate streams SS from the outlet ports 80 in the supply header 24 onto the solar radiation absorbing surface 40 in the upper end of the fluid flow channel 39. These separate streams SS rapidly spread out to become a continuous film CF within a prescribed distance $d$-CF downstream of the header 24. This distance $d$-CF is usually a few inches. When the continuous film CF strikes one of the ribs 31, it is sub-divided into separate streams SS-R by the attachment sections 46 in the web re-radiate a large portion of the solar radiation back out of the collector when it is not covered by the heat transfer fluid and thus reduce the idle temperature of surface 40. When the surface 40 is again covered by the solar radiation absorbing heat transfer fluid, the reflected or re-radiated solar radiation will be blocked and the solar radiation absorbed by the heat transfer fluid. The heat transfer fluid may be made absorbent to solar radiation in a number of different ways. One technique that is satisfactory is to mix carbon black in the fluid.

Practically, it is preferable to maintain the maximum temperature of the heat transfer fluid as low as possible to reduce thermal heat losses. Ideally, the heat transfer fluid should either absorb therein or transmit therethrough to surface 40 substantially all of the received solar heat thereon while at the same time not thermally radiate the heat therefrom in order to maximize the retained heat in the heat transfer fluid.

TABLE I

| HEAT TRANSFER FLUID: | WATER | DIMETHYL SILICONE |
|---|---|---|
| Flow rate (m): | 0.067$lb_m$/sec-ft | 0.644$lb_m$/sec-ft |
| Tile angle ($A_1$): | 45° | 45° |
| Wetting angle ($\alpha$): | 65° | Approximately 0° |
| Viscosity ($\mu$): | 0.00046$lb_m$/ft-sec at 100° F | 0.054$lb_m$/ft-sec at 100° F |
| Vapor pressure differential ($\pi c$): | 0.77 psia at 100° F | Below 0.01 psia at 100° F |
| Reynolds number ($R_e$): | 146 at 100° F | 12 at 100° F |

41 and tabs 44 of rib 31 so that all of the heat transfer fluid 15 passes through the cutouts 45 in the rib 31. The separate streams SS-R downstream of rib 31 again rapidly spread out to reform the continuous film CF as the fluid continues to flow down the collector. Thus, the solar radiation absorbing surface 40 is virtually completely covered by the film of heat transfer fluid 15.

Because the heat generated at surface 40 by the absorbed solar radiation is readily transferred to the heat transfer fluid 15 flowing thereover, the temperature of the fluid is usually substantially equal to the temperature of surface 40. Under usual operating temperatures, the temperature of the heat transfer fluid 15 as it exits the collector may range from about 70° to about 170° F depending on the temperature required to drive the equipment associated with the collector system. To maintain good efficiency of operation the temperature differential between the inlet and outlet temperatures of the heat transfer fluid may vary from about 10° to about 50° F.

Where the solar radiation is absorbed by the surface 40 and then transferred to the heat transfer fluid 15 from surface 40, the film of heat transfer fluid flowing down surface 40 should be relativly thin in order that the film blocks very little of the solar energy from reaching the surface 40. This film thickness is less than about 0.25 inch and typically is about 0.025 inch.

On the other hand, the heat transfer fluid itself may be capable of absorbing the solar radiation to heat the fluid directly. Where the fluid absorbs the solar radiation directly, it would not be necessary to make the surface 40 highly absorbent to solar radiation. This feature may be desirable, especially where the collector has idle times in which the heat transfer fluid is not being pumped onto the surface 40 and the surface 40 is being exposed to solar radiation without being cooled by the heat transfer fluid. An uncooled, dark solar radiation absorbing surface 40 may reach sufficiently high temperatures to undesirably degrade collector components since temperatures in excess of 250° F can be reached. By using a solar radiation absorbing heat transfer fluid, the surface 40 may be left bright to reflect or

We claim:

1. A solar collector system for solar radiation comprising:
   a collector assembly defining a fluid flow channel therein inclined with respect to the horizontal at a prescribed inclination angle and further defining a solar radiation absorbing surface along the bottom of said fluid flow channel onto which the solar radiation is impressed, said collector assembly further including a cover forming one side of said fluid flow channel and capable of transmitting solar radiation therethrough into said fluid flow channel;
   a heat transfer fluid for flowing down said fluid flow channel over said solar radiation absorbing surface under said cover, said heat transfer fluid having a fluid vapor pressure differential between the maximum and minimum temperatures to which said heat transfer fluid is exposed during flow down said fluid flow channel of less than about 0.3 psia; and,
   means for supplying said heat transfer fluid to the upper end of said channel for the flow of said heat transfer fluid along said channel over said solar radiation absorbing surface under the force of gravity to heat said transfer fluid.

2. The solar collector system of claim 1 wherein said heat transfer fluid further defines a wetting angle with respect to said solar radiation absorbing surface of less than about 50°.

3. The solar collector system of claim 2 wherein said heat transfer fluid defines a wetting angle with respect to said solar radiation absorbing surface of no greater than about 10° and wherein said heat transfer fluid has a fluid vapor pressure differential at the temperatures to which said fluid is exposed in the system of no greater than about 0.15 psia.

4. The solar collector system of claim 3 wherein said heat transfer fluid is a silicone fluid.

5. The solar collector system of claim 4 wherein said heat transfer fluid is dimethyl silicone.

6. The solar collector system of claim 3 wherein said collector assembly includes a plurality of collector pans; each of said collector pans having an upper end and a lower end, and comprising a generally flat bottom wall and a pair of opposed side walls along opposite sides of said bottom wall to define a portion of said fluid flow channel therebetween extending along the length of said collector pan; and each of said collector pans having a transverse cross-sectional shape so that the lower end of said one of said collector pans will nest in the upper end of another of said collector pans in order for the lower end of said bottom wall of said one of said collector pans to overlap the upper end of said bottom wall of said another of said collector-pans to form a fluid tight connection between said collector pans when said one of said collector pans is generally higher with respect to the horizontal than said another of said collector pans with said collector pans serially connected and forming said fluid flow channel substantially as long as the total length of said collector pans.

7. The solar collector system of claim 1 wherein the heat transfer fluid has a fluid vapor pressure differential at the temperatures to which said fluid is exposed in the system of no greater than about 0.15 psia.

8. The solar collector system of claim 1 wherein said collector assembly includes a plurality of collector pans; each of said collector pans having an upper end and a lower end, and comprising a generally flat bottom wall and a pair of opposed side walls along opposite sides of said bottom wall to define a portion of said fluid flow channel therebetween extending along the length of said collector pan; and each of said collector pans having a transverse cross-sectional shape so that the lower end of said one of said collector pans will nest in the upper end of another of said collector pans in order for the lower end of said bottom wall of said one of said collector pans to overlap the upper end of said bottom wall of said another of said collector pans to form a fluid tight connection between said collector pans when said one of said collector pans is generally higher with respect to the horizontal than said another of said collector pans with said collector pans serially connected and forming said fluid flow channel substantially as long as the total length of said collector pans.

9. A method of operating a solar collector system for solar radiation where the collector system defines a fluid flow channel therein with a solar radiation absorbing surface along the bottom of the fluid flow channel and with the top of the fluid flow channel formed by a cover which transmits the solar radiation therethrough onto the solar absorbing surface comprising the steps of:
a. positioning the fluid flow channel so that the solar radiation absorbing surface defines a prescribed inclination angle with respect to the horizontal and the solar radiation absorbing surface is exposed to the solar radiation; and,
b. supplying heat transfer fluid to the upper end of the fluid flow channel so that the heat transfer fluid will flow along the solar radiation absorbing surface within the fluid flow channel under the force of gravity and the solar radiation absorbing surface will heat the heat transfer fluid, the heat transfer fluid having been selected to have a vapor pressure differential between the maximum and minimum temperatures to which said heat transfer fluid is exposed during flow down said fluid flow channel of no greater than about 0.3 psia.

10. The method of claim 9 wherein the heat transfer fluid supplied in step (b) is further selected to have a wetting angle with respect to the solar radiation absorbing surface of no greater than about 50°.

11. The method of claim 10 wherein step (b) further includes supplying the heat transfer fluid to the fluid flow channel so that the generated Reynolds number does not exceed 100.

12. The method of claim 9 wherein the heat transfer fluid supplied in step (b) is further selected to have a vapor pressure differential at the temperatures to which the fluid is exposed in the system of no greater than about 0.15 psia.

13. The method of claim 12 wherein the heat transfer fluid supplied in step (b) is further selected to have a wetting angle with respect to the solar radiation absorbing surface of no greater than about 10°.

14. The method of claim 9 wherein step (b) further includes supplying the heat transfer fluid to the upper end of the fluid flow channel at a sufficient rate to produce a generated Reynolds number therein larger than the stable film Reynolds number required to produce a stable film of the heat transfer fluid on the solar radiation absorbing surface substantially covering the solar radiation absorbing surface across its width.

15. A solar collector system for solar radiation comprising:
a collector assembly defining a fluid flow channel therein inclined with respect to the horizontal at a prescribed inclination angle and further defining a substantially flat, reflective channel bottom surface along the bottom of said flow channel, said collector assembly further including a cover extending along and closing the top of said fluid flow channel, said cover transmitting solar radiation to which said cover is exposed therethrough into said fluid flow channel toward said reflective channel bottom surface, said channel bottom surface reflecting most of the solar radiation transmitted through said cover back through said cover and out of said fluid flow channel when the solar radiation is impressed directly on said channel bottom surface;
a heat transfer fluid for flowing down said fluid flow channel over said channel bottom surface under said cover, said heat transfer fluid directly absorbing the solar radiation impressed thereon to directly heat said heat transfer fluid while substantially preventing transmission of the solar radiation therethrough; and,
means for selectively supplying said heat transfer fluid to the upper end of said fluid flow channel for the flow of said heat transfer fluid along said fluid flow channel over said channel bottom surface under the force of gravity while covering said channel bottom surface so that the solar radiation transmitted through said cover will be impressed directly on the surface of said heat transfer fluid when said heat transfer fluid cover said channel bottom surface for directly heating said heat transfer fluid without transmission of the solar radiation to said channel bottom surface and so that the solar radiation will be impressed directly on said reflective bottom surface and reflected back through said cover when said heat transfer fluid is not covering said channel bottom surface to prevent overheating of said channel bottom surface.

16. A solar collector system for solar radiation comprising:

a collector assembly defining a fluid flow channel therein inclined with respect to the horizontal at a prescribed inclination angle and further defining a channel bottom surface along the bottom of said flow channel, said channel bottom surface reflecting a prescribed portion of the solar radiation impressed thereon when said heat transfer fluid is not flowing thereover to prevent overheating of said channel bottom surface; and, a heat transfer fluid flowing down said fluid flow channel over said channel bottom surface under the force of gravity so that the solar radiation is impressed thereon, said heat transfer fluid directly absorbing the solar radiation impressed thereon to directly heat said heat transfer fluid and having a fluid vapor pressure differential between the maximum and minimum temperatures to which said heat transfer fluid is exposed during flow down said fluid flow channel of less than about 0.3 psia.

17. The solar collector system of claim 16 wherein said heat transfer fluid further defines a wetting angle with respect to said channel bottom surface of less than about 50°.

18. The solar collector system of claim 16 wherein said heat transfer fluid includes carbon black particles.

19. A modular solar collector construction for use in collecting solar energy and adapted to be supported between adjacent rafters in the roof structure of a building comprising:

a collector pan assembly adapted to be supported between adjacent rafters of the roof structure, said collector pan assembly including at least two collector troughs, each of said collector troughs having an upper end and a lower end, and comprising a generally flat bottom wall and a pair of opposed side walls along opposite sides of said flat bottom wall, said bottom wall and said side walls defining an open top fluid flow channel along the length of each of said collector troughs, the lower end of each of said collector troughs having a first prescribed interior shape and size and the upper end of each of said collector troughs having a second prescribed exterior shape and size complimentary to said first prescribed shape and size of the lower end of said collector trough so that the lower end of said one of said troughs will nest in the upper end of said other of said troughs in order for the lower end of said bottom wall of said one of said troughs to overlap the upper end of said bottom wall of said other of said troughs to form a fluid tight connection between said troughs when said one of said troughs is generally higher than said other of said troughs with respect to the horizontal with said troughs serially connected and forming said collection pan assembly with a common fluid flow channel substantially as long as the total length of said collector troughs;

at least one cover extending between said side walls of said collector trough to close the open top of the common fluid flow channel, said cover capable of transmitting solar radiation therethrough into the common fluid flow channel;

a heat transfer fluid;

fluid supply means for introducing said heat transfer fluid into the common fluid flow channel at the upper higher end of said collector trough assembly so that said heat transfer fluid flows in the common fluid flow channel along the combined lengths of said bottom walls of said collector troughs under the influence of gravity to be heated by the solar radiation transmitted through said cover, said fluid supply means including a fluid supply header defining a fluid reservoir therein and a plurality of discharge ports from said fluid reservoir to discharge said heat transfer fluid carried in said fluid reservoir therefrom through said discharge ports in a plurality of individual and separate streams into said fluid flow channel in said collector pan assembly at spaced apart positions across the width of said fluid flow channel; and, fluid return means for receiving said heat transfer fluid from said fluid flow channel in said collector trough at a point downstream of the upper end of said collector trough for recirculation of the fluid.

20. The modular solar collector construction of claim 19 wherein said discharge ports defined in said header are vertically elongated and define a substantially constant cross-sectional width along the height thereof to minimize the variation in the amount of said heat transfer fluid discharged therefrom into said fluid flow channel due to said header being unlevel.

21. The modular solar collector construction of claim 19 wherein each of said discharge ports defined in said header is vertically elongated and has a generally decreasing cross-sectional width from its lower end to its upper end to minimize the variation in the amount of said heat transfer fluid discharged therethrough due to said header being unlevel.

22. A modular solar collector construction for use in collecting solar energy and adapted to be supported between adjacent rafters in the roof structure of a building comprising:

a collector pan assembly adapted to be supported between adjacent rafters of the roof structure, said collector pan assembly including at least two collector troughs, each of said collector troughs having an upper end and a lower end, and comprising a generally flat bottom wall and a pair of opposed side walls along opposite sides of said flat bottom wall, said bottom wall and said side walls defining an open top fluid flow channel along the length of each of said collector troughs, the lower end of each of said collector troughs having a first prescribed interior shape and size and the upper end of each of said collector troughs having a second prescribed exterior shape and size complimentary to said first prescribed shape and size of the lower end of said collector trough so that the lower end of said one of said troughs will nest in the upper end of said other of said troughs in order for the lower end of said bottom wall of said one of said troughs to overlap the upper end of said bottom wall of said other of said troughs to form a fluid tight connection between said troughs when said one of said troughs is generally higher than said other of said troughs with respect to the horizontal with said troughs serially connected and forming said collection pan assembly with a common fluid flow channel substantially as long as the total length of said collector troughs, said collector pan assembly further including rib means for maintaining said generally flat bottom wall of said collector troughs in a substantially flat plane;

at least one cover extending between said side walls of said collector trough to close the open top of the common fluid flow channel, said cover capable of transmitting solar radiation therethrough into the common fluid flow channel;

a heat transfer fluid;

fluid supply means for introducing said heat transfer fluid into the common fluid flow channel at the upper higher end of said collector trough assembly so that said heat transfer fluid flows in the common fluid flow channel along the combined lengths of said bottom walls of said collector troughs under the influence of gravity to be heated by the solar radiation transmitted through said cover; and fluid return means for receiving said heat transfer fluid from said fluid flow channel in said collector trough at a point downstream of the upper end of said collector trough for recirculation of the fluid.

23. A modular solar collector construction for use in collecting solar energy and adapted to be supported between adjacent rafters in the roof structure of a building comprising:

a heat transfer fluid;

a collector pan assembly adapted to be supported between adjacent rafters of the roof structure, said collector pan assembly including at least two collector troughs, each of said collector troughs having an upper end and a lower end, and comprising a generally flat bottom wall and a pair of opposed side walls along opposite sides of said flat bottom wall, said bottom wall and said side walls defining an open top fluid channel along the length of each of said collector troughs, the lower end of each of said collector troughs having a first prescribed interior shape and size and the upper end of each of said collector troughs having a second prescribed exterior shape and size complimentary to said first prescribed shape and size of the lower end of said collector trough so that the lower end of said one of said troughs will nest in the upper end of said other of said troughs in order for the lower end of said bottom wall of said one of said troughs to overlap the upper end of said bottom wall of said other of said troughs to form a fluid tight connection between said troughs when said one of said troughs is generally higher than said other of said troughs with respect to the horizontal with said troughs serially connected and forming said collection pan assembly with a common fluid flow channel substantially as long as the total length of said collector troughs, said collector pan assembly further including a plurality of reinforcing ribs mounted on said bottom wall of said collector trough within said fluid flow channel and arranged generally normal to the flow of said heat transfer fluid down said bottom wall of said collector trough, each of said reinforcing ribs attached to said bottom wall at a plurality of spaced apart positions across the width of said bottom wall to maintain said bottom wall in a generally flat plane and each of said ribs further defining a plurality of cutouts therein between said positions at which said rib is attached to said bottom wall for said heat transfer fluid to flow through said cutouts as said heat transfer fluid flows down said bottom wall of said collector pan assembly;

at least one cover extending between said side walls of said collector trough to close the open top of the common fluid flow channel, said cover capable of transmitting solar radiation therethrough into the common fluid flow channel;

fluid supply means for introducing said heat transfer fluid into the common fluid flow channel at the upper higher end of said collector trough assembly so that said heat transfer fluid flows in the common fluid flow channel along the combined lengths of said bottom walls of said collector troughs under the influence of gravity to be heated by the solar radiation transmitted through said cover; and, fluid return means for receiving said heat transfer fluid from said fluid flow channel in said collector trough at a point downstream of the upper end of said collector trough for recirculation of the fluid.

24. A solar collector system for solar radiation comprising:

a collector assembly defining a fluid flow channel therein inclined with respect to the horizontal at a prescribed inclination angle and further defining a bottom surface along the bottom of said fluid flow channel onto which the solar radiation is impressed;

a heat transfer fluid for flowing down said fluid flow channel over said channel bottom surface under the influence of gravity to be heated by the solar radiation;

a fluid supply header defining a fluid reservoir therein and a plurality of discharge ports from said fluid reservoir to discharge said heat transfer fluid carried in said fluid reservoir therefrom through said discharge ports in a plurality of individual and separate streams into said fluid flow channel in said collector assembly at spaced apart positions across the width of said fluid flow channel, each of said discharge ports being vertically elongated and having a substantially constant cross-sectional width along the height thereof to minimize the variation in the amount of said heat transfer fluid discharged therefrom into said fluid flow channel due to said header being unlevel; and, supply means for supplying said heat transfer fluid to said fluid reservoir in said supply header to raise the level of said heat transfer fluid in said reservoir sufficiently to cause said heat transfer fluid to flow from said discharge ports in said supply header.

25. A solar collector system for solar radiation comprising:

a collector assembly defining a fluid flow channel therein inclined with respect to the horizontal at a prescribed inclination angle and further defining a bottom surface along the bottom of said fluid flow channel onto which the solar radiation is impressed;

a heat transfer fluid for flowing down said fluid flow channel over said channel bottom surface under the influence of gravity to be heated by the solar radiation;

a fluid supply header defining a fluid reservoir therein and a plurality of discharge ports from said fluid reservoir to discharge said heat transfer fluid carried in said fluid reservoir therefrom through said discharge ports in a plurality of individual and separate streams into said fluid flow channel in said collector assembly at spaced apart positions across the width of said fluid flow channel, each of said discharge ports defined in said header being vertically elongated and having a generally decreasing cross-sectional width from its lower end to its upper end to minimize the variation in the amount of said heat transfer fluid discharged therethrough due to said header being unlevel; and, supply means for supplying said heat transfer fluid to said fluid reservoir in said supply header to raise the level of said heat transfer fluid in said reservoir sufficiently to cause said heat transfer fluid to flow from said discharge ports in said supply header.

26. A method of operating a solar collector system for solar radiation where the collector system defines a fluid flow channel therein with a solar radiation absorbing surface along the bottom of the fluid flow channel and with the top of the fluid flow channel formed by a cover which transmits the solar radiation therethrough onto the solar absorbing surface comprising the steps of:

a. positioning the fluid flow channel so that the solar radiation absorbing surface defines a prescribed inclination angle with respect to the horizontal and the solar radiation absorbing surface is exposed to the solar radiation; and, b. supplying heat transfer fluid to the upper end of the fluid flow channel so that the heat transfer fluid will flow along the solar radiation absorbing surface within the fluid flow channel under the force of gravity and the solar radiation absorbing surface will heat the heat transfer fluid, the heat transfer fluid having been selected to define a wetting angle with respect to said solar radiation absorbing surface of less than about 50°.

27. The method of claim 26 wherein the heat transfer fluid supplied in step (b) is further selected to define a wetting angle with respect to the solar radiation absorbing surface of less than about 10°.

* * * * *